UNITED STATES PATENT OFFICE.

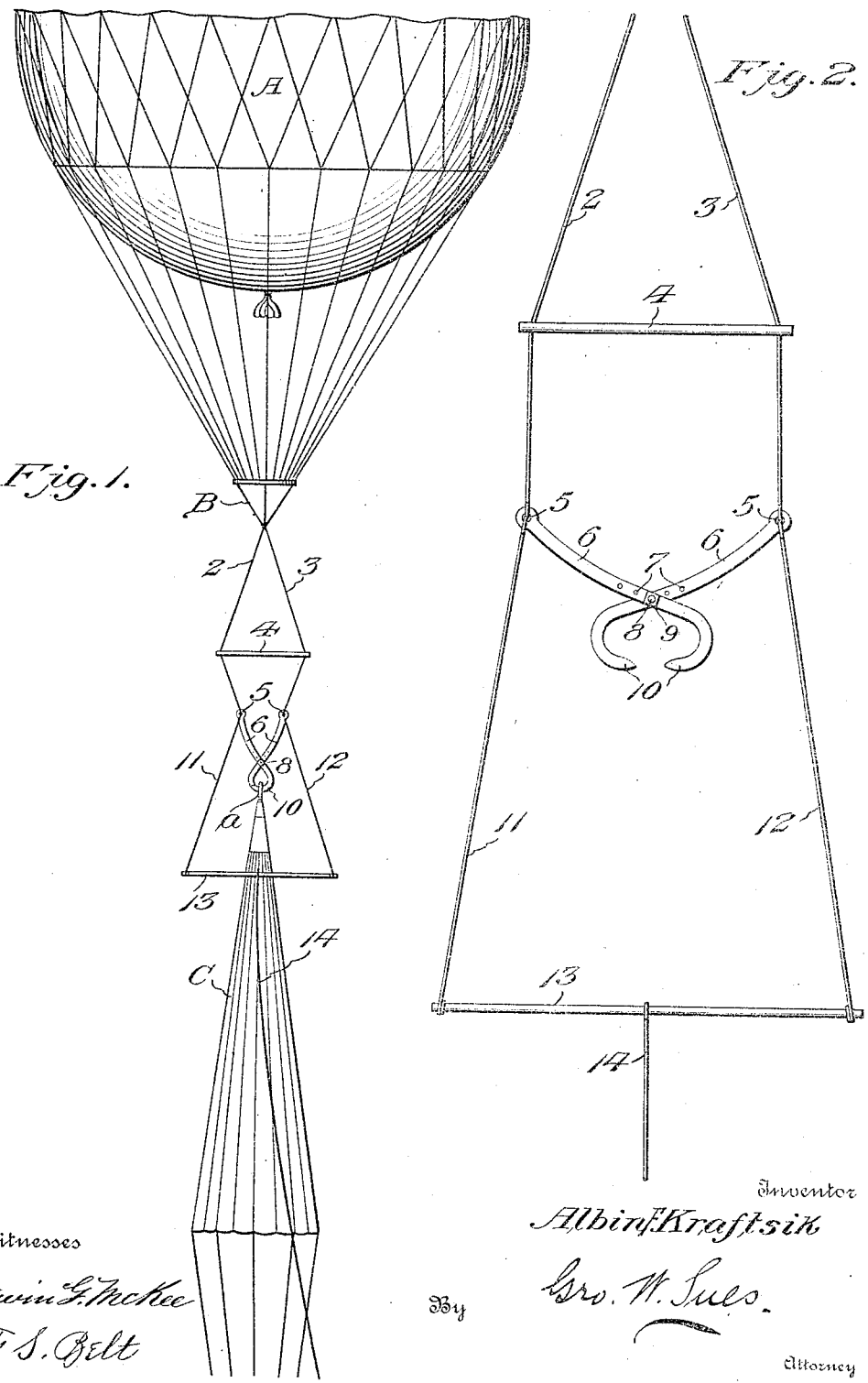

ALBIN F. KRAFTSIK, OF MOUNT PLEASANT, PENNSYLVANIA.

BALLOON ATTACHMENT.

1,017,767.  Specification of Letters Patent.  Patented Feb. 20, 1912.

Application filed June 27, 1911. Serial No. 635,615.

*To all whom it may concern:*

Be it known that I, ALBIN F. KRAFTSIK, a citizen of the United States, and a resident of Mount Pleasant, in the county of Westmoreland and State of Pennsylvania, have invented certain new and useful Improvements in Balloon Attachments, of which the following is a specification, reference being had to the accompanying drawings.

This invention has relation to an improved releasing mechanism employed in connection with a balloon or other aerial carrier, and the object of my invention is to provide a device of this general character of a simple and inexpensive nature and of a light and durable construction which shall be capable of accurate adjustment below a balloon or other aerial carrier in such a manner that a parachute or other member may be instantly detached.

Another object is to provide a captive balloon with a releasing mechanism including two lever arms ending in beak hooks, which engage the parachute or other member to be released, the mechanism being automatically actuated by the anchoring strand so that after the balloon has traveled a predetermined distance the parachute may be automatically released.

With these and other objects in view the present invention consists in the combination and arrangement of parts as will be hereinafter more fully described and finally pointed out in the appended claims, it being further understood that changes in the specific structure shown and described may be made within the scope of the claims, without departing from the spirit of the invention.

In the accompanying drawings forming a part of this specification, and in which like numerals of reference indicate similar parts in the several views: Figure 1, shows an elevational view disclosing a fragmentary portion of a balloon carrying a releasing mechanism embodying my invention, the mechanism being shown as carrying a parachute. Fig. 2, is an enlarged detail disclosing the releasing mechanism in its opened position.

In my present invention I provide a light, simply constructed releasing mechanism especially arranged to be used in connection with a captive balloon, so that a parachute or like device carried by the balloon may be automatically released after the balloon has traveled a predetermined distance from the starting point or which may be instantly released, on manipulating the anchoring strand.

In the drawings the letter A, designates a balloon provided with the usual carrying net B. This net, as shown in Fig. 1, gives support to two pliable members 2 and 3, in the form of hemp or like strands, which are held securely but adjustably within the ends of the carrier bar 4. The bar 4, can be slid backward or forward under force, upon the strands 2 and 3. Secured to the pliable members 2 and 3, intermediate of their ends, are the counterpart levers 6, 6, having the apertured ears 5, each lever ending in a beak hook 10. As shown in Fig. 2, each lever has a plurality of openings 7, arranged to receive a bolt 8, which is secured by means of a nut 9. By means of this adjustably held bolt 8, the spread of the levers may be regulated. Secured to the ends 11 and 12, of the pliable members 2 and 3, is the trigger bar 13, which is preferably of a length greater than the carrier bar 4, and held in parallel spaced relation to said bar 4, as shown in the drawings. Secured to the trigger bar 13, is the anchoring strand 14. In their normal position, as shown in Fig. 1, the beak hooks 10, overlap one another. The anchoring strand 14, is wound over a suitable spool or is otherwise secured in a manner permitting the same being wound and unwound.

In the drawings the letter C, designates a parachute of conventional construction to the peak of which is secured a ring $a$. This ring is arranged to be brought into engagement with the overlapping beaks or hook ends of the levers as shown in Fig. 1.

In securing a parachute to the detaching device, the arms 6, must be brought together or toward one another, as shown in Fig. 1. The weight of the parachute then aids in holding the hooks together in which condition the pliable connections below the carrying bar 4, are held at an angle, as shown in Fig. 1. However, any strain on the strand 14, will result in the bar 13, receding from the bar 14, so that the pliable connection below the carrier bar 4, will be straightened out, resulting in the lever 6, being spread outward opening the beak hooks and allowing the ring $a$, to escape. As soon as the parachute is released, the weight carried by the same will cause the parachute to open.

My device is especially adapted to be used as a toy and can further be used in detaching an explosive or an advertising member, which can be released automatically after the balloon has risen to a predetermined distance, or jerked loose at any desired time.

The device is simple and inexpensive in construction and both durable and efficient in operation, and the mechanism can be readily actuated to release the carried member.

Having thus described my said invention, what I claim as new and desire to secure by United States Letters Patent is:

1. A detaching device for an aerial carrier, comprising a suitably supported carrier bar, a trigger bar of a length greater than said carrier bar, a pliable connection extending from each end of said carrier bar each connection being secured to one end of said trigger bar, two pivotally connected lever arms each ending in a beak hook, each arm being secured to one of said pliable connections intermediate of its ends, said beak hooks normally overlapping one another, and a trigger cord connected to said trigger bar.

2. A detaching device for an aerial carrier, comprising a suitably supported carrier bar, a trigger bar of a length greater than said carrier bar, a pliable connection extending from each end of said carrier bar each connection being secured to one end of said trigger bar, two pivotally connected lever arms each ending in a beak hook, each arm being secured to one of said pliable connections intermediate of its ends, said beak hooks normally overlapping one another, and a trigger cord connected to said trigger bar, said trigger bar held parallel to said carrier bar.

3. A detaching device for an aerial carrier, comprising a suitably supported carrying member, a trigger bar, two pliable connections extending from said carrying member and secured to the ends of said trigger bar, two similar lever arms each ending in a beak hook one beak hook being secured to each of said strands each of said levers having a plurality of bolt openings, a bolt connecting said two similar lever arms, and a strand extending from said trigger bar.

In testimony whereof I affix my signature, in presence of two witnesses.

ALBIN F. KRAFTSIK.

Witnesses:
A. C. SNEDDEN,
R. D. FAUST.